(12) United States Patent
Deliz Centeno et al.

(10) Patent No.: US 12,693,528 B2
(45) Date of Patent: Jul. 28, 2026

(54) ELECTRONIC DEVICE WITH A MOTION SENSOR

(71) Applicant: Apple Inc., Cupertino, CA (US)

(72) Inventors: Luis R Deliz Centeno, Fremont, CA (US); Devin W Chalmers, Oakland, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/798,064

(22) Filed: Aug. 8, 2024

(65) Prior Publication Data

US 2025/0093642 A1 Mar. 20, 2025

Related U.S. Application Data

(60) Provisional application No. 63/584,050, filed on Sep. 20, 2023.

(51) Int. Cl.
G02B 27/00 (2006.01)
G02B 27/01 (2006.01)

(52) U.S. Cl.
CPC ..... G02B 27/0093 (2013.01); G02B 27/0172 (2013.01)

(58) Field of Classification Search
CPC ........................ G02B 27/0093; G02B 27/0172
See application file for complete search history.

(56) References Cited

U.S. PATENT DOCUMENTS

| | | | |
|---|---|---|---|
| 9,779,540 B2 | 10/2017 | Katz et al. | |
| 10,852,165 B1 * | 12/2020 | Davis | G01C 21/20 |
| 11,409,497 B2 | 8/2022 | Parkinson | |
| 11,726,561 B2 | 8/2023 | Watola et al. | |
| 2016/0034143 A1 * | 2/2016 | Sharma | G06F 3/0346 |
| | | | 715/810 |
| 2021/0034167 A1 * | 2/2021 | Rizzardini | G06F 3/017 |

* cited by examiner

*Primary Examiner* — Amit Chatly
(74) *Attorney, Agent, or Firm* — Treyz Law Group, P.C.; Joseph F. Guihan

(57) ABSTRACT

In a head-mounted device, position and motion sensors may be included to determine the orientation of the head-mounted device. A motion sensor may experience error that accumulates over time, sometimes referred to as drift. To mitigate the effect of drift in a motion sensor, a reference orientation for the motion sensor may be reset when a qualifying motion is detected. The qualifying motion may be detected using one or more criteria such as a total change in angular orientation or rate of change in angular orientation. The reference orientation for the motion sensor may also be reset when a duration of time elapses without a qualifying motion being detected.

21 Claims, 10 Drawing Sheets

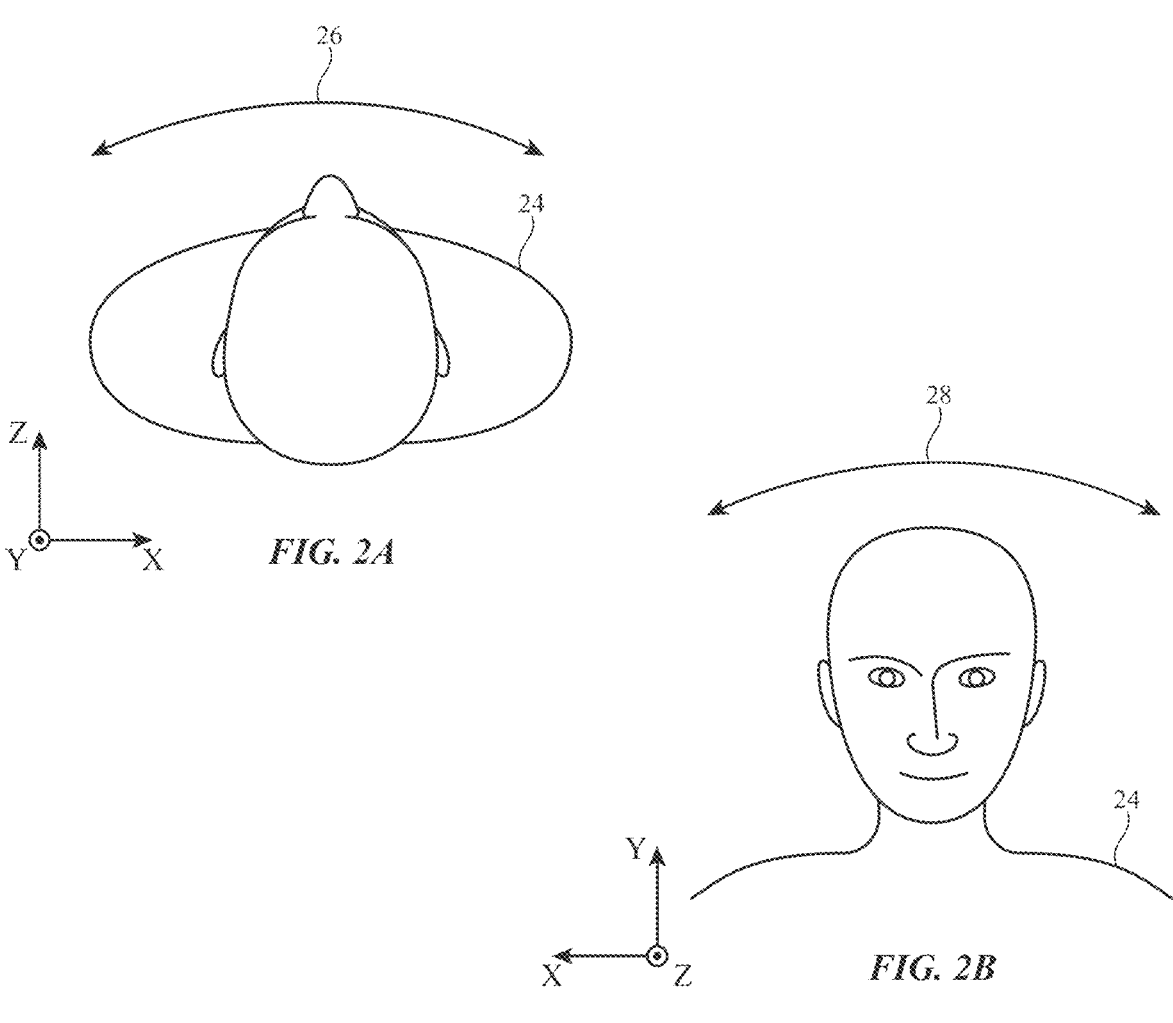
*FIG. 2A*
*FIG. 2B*
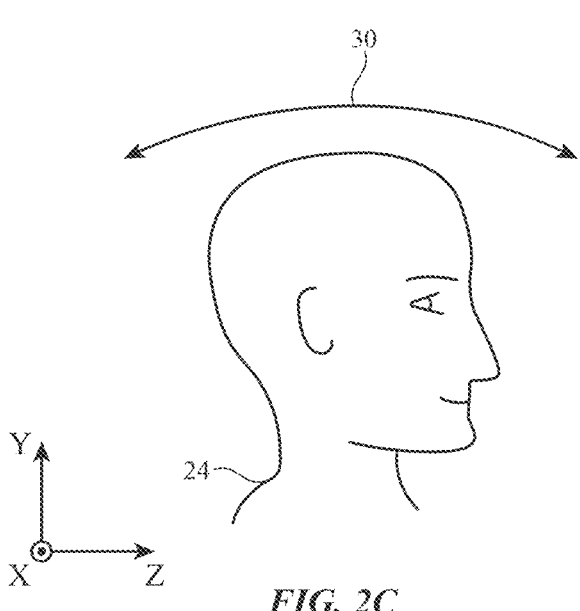
*FIG. 2C*

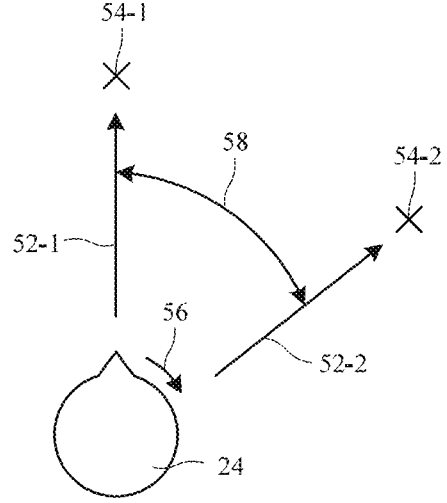
*FIG. 3A*
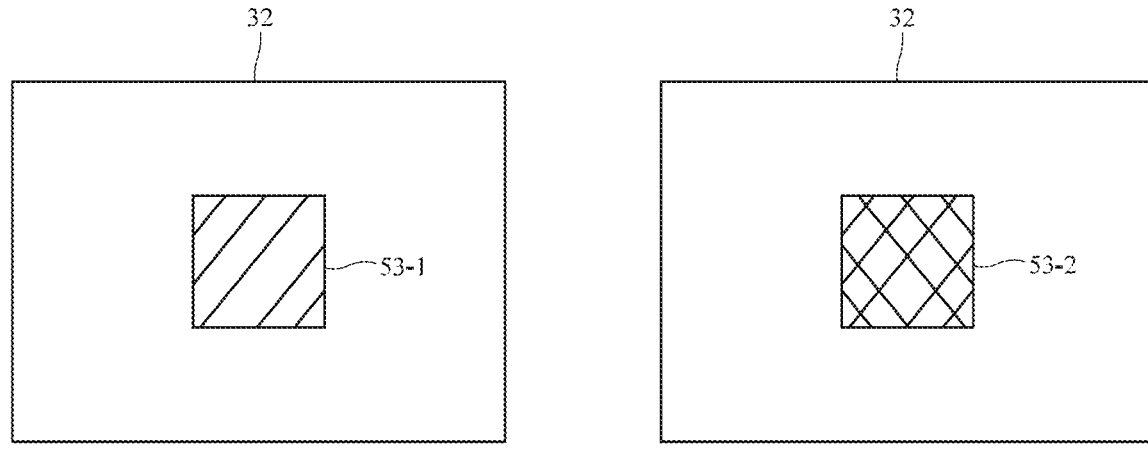
*FIG. 3B*          *FIG. 3C*

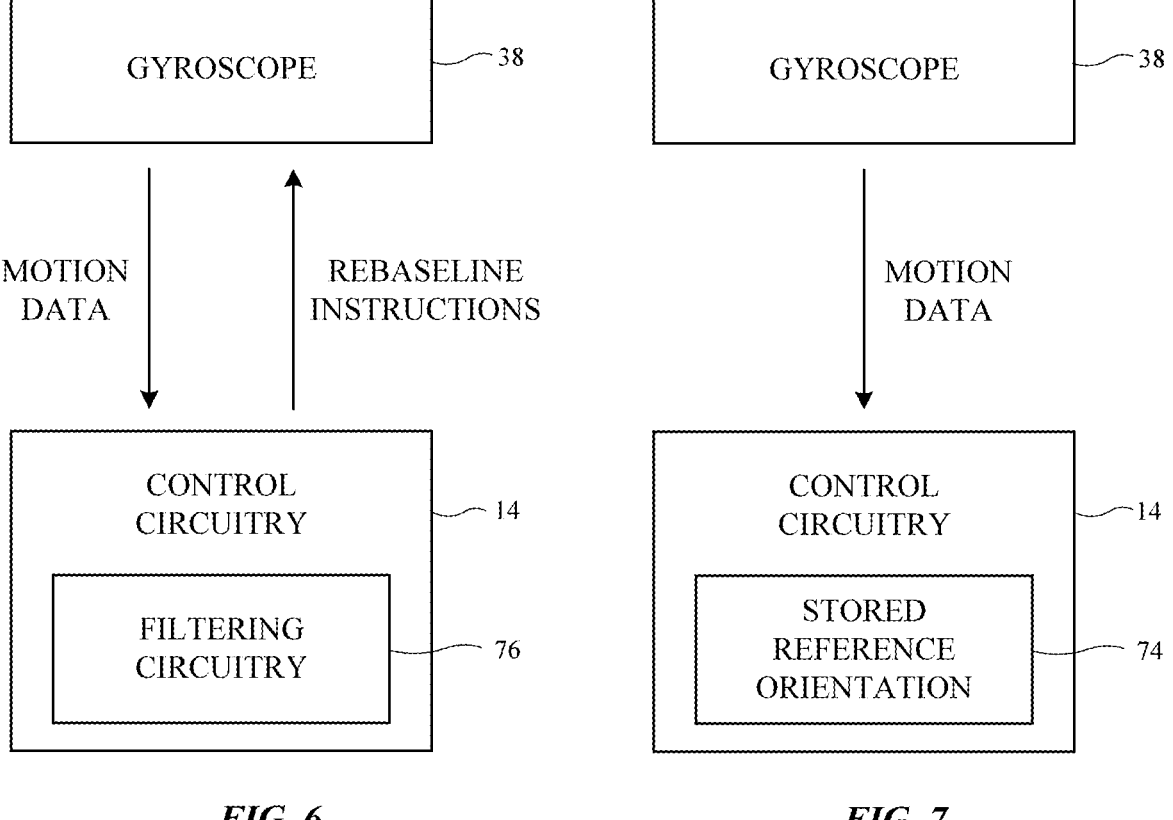
FIG. 6          FIG. 7

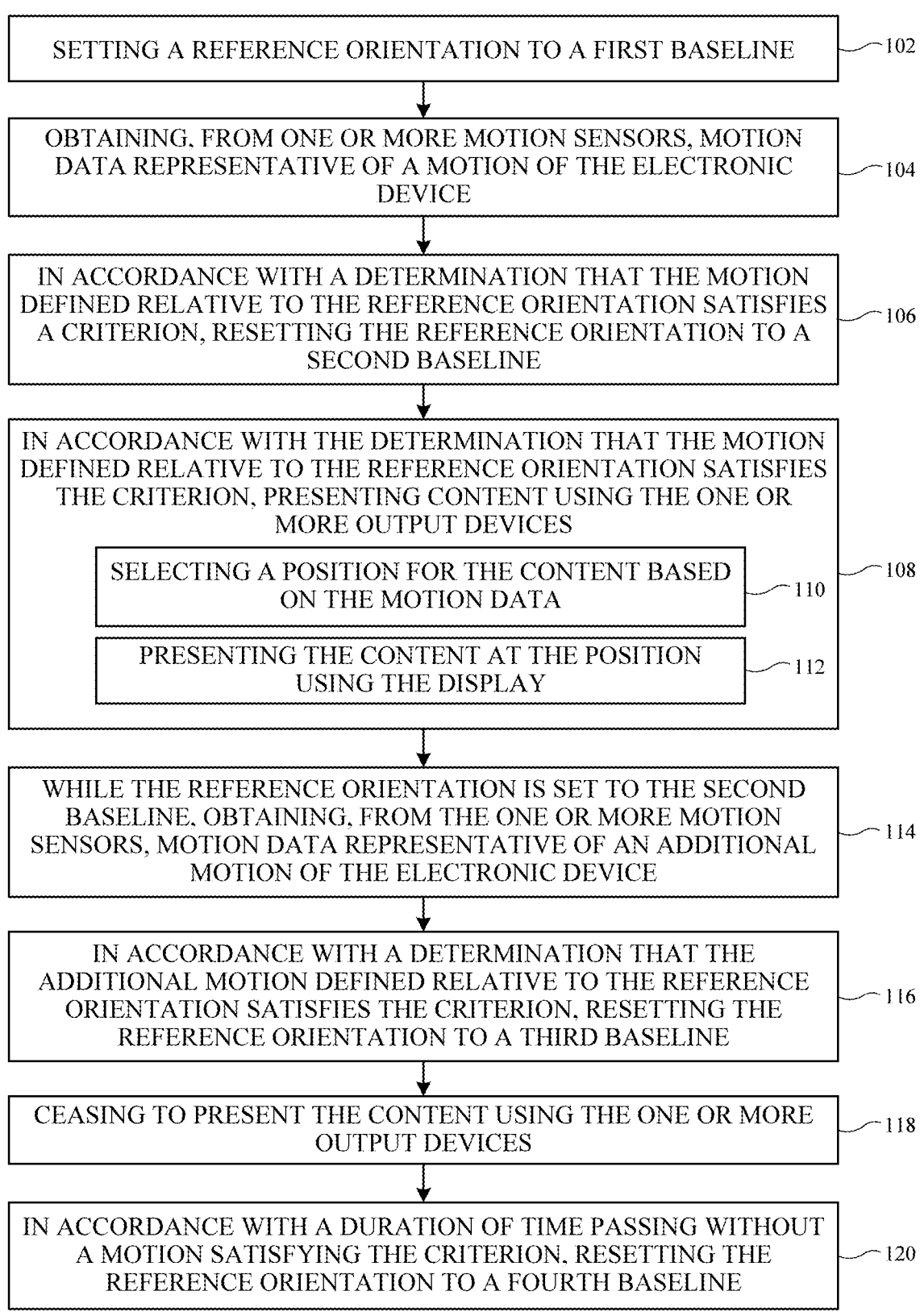

SETTING A REFERENCE ORIENTATION TO A FIRST BASELINE ⟋102

OBTAINING, FROM ONE OR MORE MOTION SENSORS, MOTION DATA REPRESENTATIVE OF A MOTION OF THE ELECTRONIC DEVICE ⟋104

IN ACCORDANCE WITH A DETERMINATION THAT THE MOTION DEFINED RELATIVE TO THE REFERENCE ORIENTATION SATISFIES A CRITERION, RESETTING THE REFERENCE ORIENTATION TO A SECOND BASELINE ⟋106

IN ACCORDANCE WITH THE DETERMINATION THAT THE MOTION DEFINED RELATIVE TO THE REFERENCE ORIENTATION SATISFIES THE CRITERION, PRESENTING CONTENT USING THE ONE OR MORE OUTPUT DEVICES ⟋108

SELECTING A POSITION FOR THE CONTENT BASED ON THE MOTION DATA ⟋110

PRESENTING THE CONTENT AT THE POSITION USING THE DISPLAY ⟋112

WHILE THE REFERENCE ORIENTATION IS SET TO THE SECOND BASELINE, OBTAINING, FROM THE ONE OR MORE MOTION SENSORS, MOTION DATA REPRESENTATIVE OF AN ADDITIONAL MOTION OF THE ELECTRONIC DEVICE ⟋114

IN ACCORDANCE WITH A DETERMINATION THAT THE ADDITIONAL MOTION DEFINED RELATIVE TO THE REFERENCE ORIENTATION SATISFIES THE CRITERION, RESETTING THE REFERENCE ORIENTATION TO A THIRD BASELINE ⟋116

CEASING TO PRESENT THE CONTENT USING THE ONE OR MORE OUTPUT DEVICES ⟋118

IN ACCORDANCE WITH A DURATION OF TIME PASSING WITHOUT A MOTION SATISFYING THE CRITERION, RESETTING THE REFERENCE ORIENTATION TO A FOURTH BASELINE ⟋120

*FIG. 9*

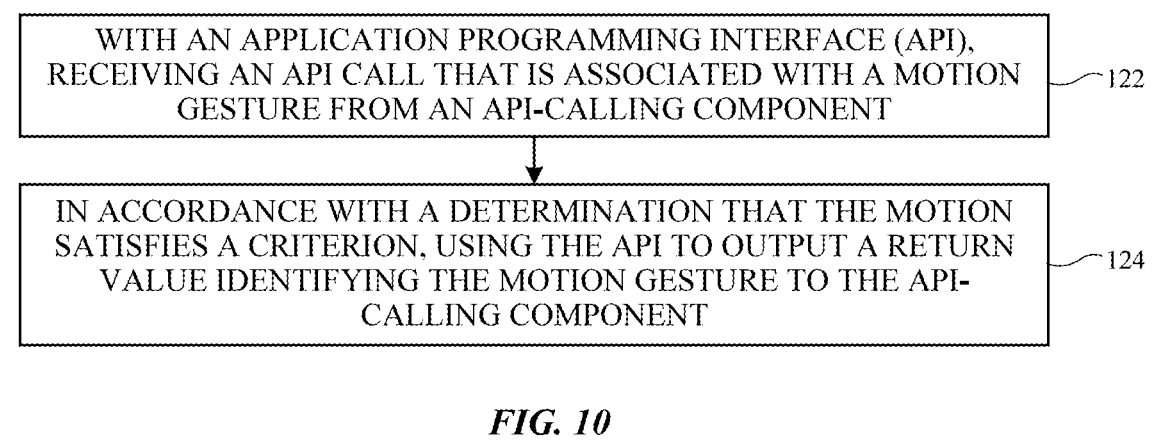

WITH AN APPLICATION PROGRAMMING INTERFACE (API), RECEIVING AN API CALL THAT IS ASSOCIATED WITH A MOTION GESTURE FROM AN API-CALLING COMPONENT — 122

IN ACCORDANCE WITH A DETERMINATION THAT THE MOTION SATISFIES A CRITERION, USING THE API TO OUTPUT A RETURN VALUE IDENTIFYING THE MOTION GESTURE TO THE API-CALLING COMPONENT — 124

*FIG. 10*

ELECTRONIC DEVICE WITH A MOTION SENSOR

This application claims the benefit of U.S. provisional patent application No. 63/584,050 filed Sep. 20, 2023, which is hereby incorporated by reference herein in its entirety.

BACKGROUND

This relates generally to head-mounted devices, and, more particularly, to head-mounted devices with displays.

Some electronic devices such as head-mounted devices include motion sensors that detect motion of the electronic device during operation of the electronic device. Motion sensors may have associated error. If care is not taken, error in motion sensors may decrease reliability when operating the electronic device.

SUMMARY

An electronic device may include one or more motion sensors, one or more processor, and memory storing instructions configured to be executed by the one or more processors, the instructions for: setting a reference orientation to a first baseline, obtaining, from the one or more motion sensors, motion data representative of a motion of the electronic device, and in accordance with a determination that the motion defined relative to the reference orientation satisfies a criterion, resetting the reference orientation to a second baseline.

An electronic device may include one or more motion sensors configured to obtain motion data representative of motion of the electronic device, one or more processors, and memory storing instructions configured to be executed by the one or more processors, the instructions for: with an application programming interface (API), receiving an API call that is associated with a motion gesture from an API-calling component and in accordance with a determination that the motion satisfies a criterion, using the API to output a return value that identifies the motion gesture to the API-calling component.

BRIEF DESCRIPTION OF THE DRAWINGS

FIGS. 2A-2C are diagrams of an illustrative user of a head-mounted device showing how the user's head pose may be defined by yaw, roll, and pitch, respectively in accordance with some embodiments.

FIG. 3A is a top view of an illustrative extended reality environment showing an illustrative head movement and virtual content at different locations in accordance with some embodiments.

FIG. 3B is a view of an illustrative display as perceived by a viewer at a first head position in the extended reality environment of FIG. 3A in accordance with some embodiments.

FIG. 3C is a view of an illustrative display as perceived by a viewer at a second head position in the extended reality environment of FIG. 3A in accordance with some embodiments.

FIG. 6 is a schematic diagram of an illustrative head-mounted device in which control circuitry sends rebaseline instructions to a motion sensor in accordance with some embodiments.

FIG. 7 is a schematic diagram of an illustrative head-mounted device in which control circuitry resets a stored reference orientation in accordance with some embodiments.

FIG. 9 is a flowchart showing an illustrative method for operating an electronic device with a motion sensor and an associated reference orientation in accordance with some embodiments.

FIG. 10 is a flowchart showing an illustrative method for operating an electronic device with a motion sensor and an application programming interface in accordance with some embodiments.

DETAILED DESCRIPTION

Figure 1:
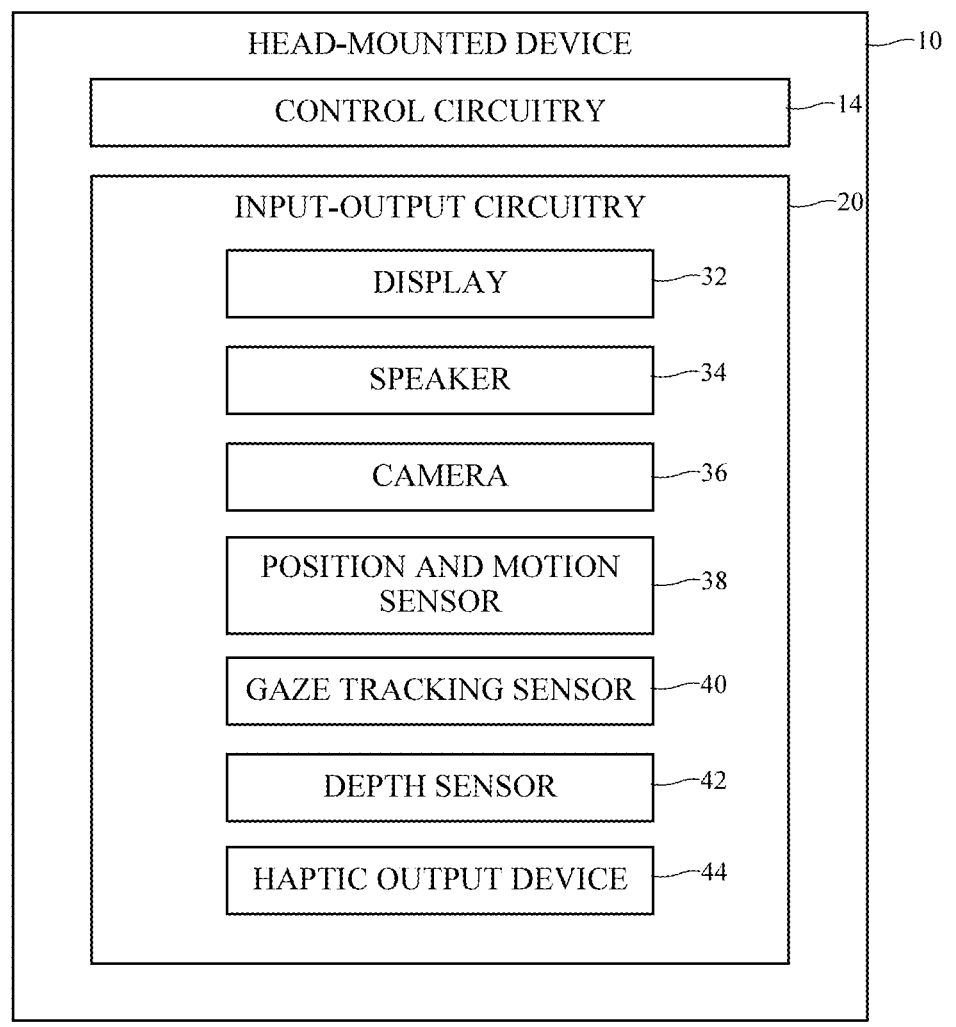
FIG. 1 is a schematic diagram of an illustrative head-mounted device in accordance with some embodiments.

Head-mounted devices may display different types of extended reality content for a user. The head-mounted device may display a virtual object that is perceived at an apparent depth within the physical environment of the user. Virtual objects may sometimes be displayed at fixed locations relative to the physical environment of the user. For example, consider an example where a user's physical environment includes a table. A virtual object may be displayed for the user such that the virtual object appears to be resting on the table. As the user moves their head and otherwise interacts with the XR environment, the virtual object remains at the same, fixed position on the table (e.g., as if the virtual object were another physical object in the XR environment). This type of content may be referred to as world-locked content (because the position of the virtual object is fixed relative to the physical environment of the user).

Other virtual objects may be displayed at locations that are defined relative to the head-mounted device or a user of the head-mounted device. First, consider the example of virtual objects that are displayed at locations that are defined relative to the head-mounted device. As the head-mounted device moves (e.g., with the rotation of the user's head), the virtual object remains in a fixed position relative to the head-mounted device. For example, the virtual object may be displayed in the front and center of the head-mounted device (e.g., in the center of the device's or user's field-ofview) at a particular distance. As the user moves their head left and right, their view of their physical environment changes accordingly. However, the virtual object may remain fixed in the center of the device's or user's field of view at the particular distance as the user moves their head (assuming gaze direction remains constant). This type of content may be referred to as head-locked content. The head-locked content is fixed in a given position relative to the head-mounted device (and therefore the user's head which is supporting the head-mounted device). The head-locked content may not be adjusted based on a user's gaze direction. In other words, if the user's head position remains constant and their gaze is directed away from the head-locked content, the head-locked content will remain in the same apparent position.

Second, consider the example of virtual objects that are displayed at locations that are defined relative to a portion of the user of the head-mounted device (e.g., relative to the user's torso). This type of content may be referred to as body-locked content. For example, a virtual object may be displayed in front and to the left of a user's body (e.g., at a location defined by a distance and an angular offset from a forward-facing direction of the user's torso), regardless of which direction the user's head is facing. If the user's body is facing a first direction, the virtual object will be displayed in front and to the left of the user's body. While facing the first direction, the virtual object may remain at the same, fixed position relative to the user's body in the XR environment despite the user rotating their head left and right (to look towards and away from the virtual object). However, the virtual object may move within the device's or user's field of view in response to the user rotating their head. If the user turns around and their body faces a second direction that is the opposite of the first direction, the virtual object will be repositioned within the XR environment such that it is still displayed in front and to the left of the user's body. While facing the second direction, the virtual object may remain at the same, fixed position relative to the user's body in the XR environment despite the user rotating their head left and right (to look towards and away from the virtual object).

In the aforementioned example, body-locked content is displayed at a fixed position/orientation relative to the user's body even as the user's body rotates. For example, the virtual object may be displayed at a fixed distance in front of the user's body. If the user is facing north, the virtual object is in front of the user's body (to the north) by the fixed distance. If the user rotates and is facing south, the virtual object is in front of the user's body (to the south) by the fixed distance.

Alternatively, the distance offset between the body-locked content and the user may be fixed relative to the user whereas the orientation of the body-locked content may remain fixed relative to the physical environment. For example, the virtual object may be displayed in front of the user's body at a fixed distance from the user as the user faces north. If the user rotates and is facing south, the virtual object remains to the north of the user's body at the fixed distance from the user's body.

Body-locked content may also be configured to always remain gravity or horizon aligned, such that head and/or body changes in the roll orientation would not cause the body-locked content to move within the XR environment. Translational movement may cause the body-locked content to be repositioned within the XR environment to maintain the fixed distance from the user. Subsequent descriptions of body-locked content may include both of the aforementioned types of body-locked content.

A schematic diagram of an illustrative head-mounted device is shown in FIG. 1. As shown in FIG. 1, head-mounted device 10 (sometimes referred to as electronic device 10, system 10, head-mounted display 10, etc.) may have control circuitry 14. Control circuitry 14 may be configured to perform operations in head-mounted device 10 using hardware (e.g., dedicated hardware or circuitry), firm-ware and/or software. Software code for performing operations in head-mounted device 10 and other data is stored on non-transitory computer readable storage media (e.g., tangible computer readable storage media) in control circuitry 14. The software code may sometimes be referred to as software, data, program instructions, instructions, or code. The non-transitory computer readable storage media (sometimes referred to generally as memory) may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 14. The processing circuitry may include application-specific integrated circuits with processing circuitry, one or more microprocessors, digital signal processors, graphics processing units, a central processing unit (CPU) or other processing circuitry.

Head-mounted device 10 may include input-output circuitry 20. Input-output circuitry 20 may be used to allow data to be received by head-mounted device 10 from external equipment (e.g., a tethered computer, a portable device such as a handheld device or laptop computer, or other electrical equipment) and to allow a user to provide head-mounted device 10 with user input. Input-output circuitry 20 may also be used to gather information on the environment in which head-mounted device 10 is operating. Output components in circuitry 20 may allow head-mounted device 10 to provide a user with output and may be used to communicate with external electrical equipment.

As shown in FIG. 1, input-output circuitry 20 may include a display such as display 32. Display 32 may be used to display images for a user of head-mounted device 10. Display 32 may be a transparent display so that a user may observe physical objects through the display while computer-generated content is overlaid on top of the physical objects by presenting computer-generated images on the display. A transparent display may be formed from a transparent pixel array (e.g., a transparent organic light-emitting diode display panel) or may be formed by a display device that provides images to a user through a beam splitter, holographic coupler, or other optical coupler (e.g., a display device such as a liquid crystal on silicon display). Alternatively, display 32 may be an opaque display that blocks light from physical objects when a user operates head-mounted device 10. In this type of arrangement, a pass-through camera may be used to display physical objects to the user. The pass-through camera may capture images of the physical environment and the physical environment images may be displayed on the display for viewing by the user. Additional computer-generated content (e.g., text, game-content, other visual content, etc.) may optionally be overlaid over the physical environment images to provide an extended reality environment for the user. When display 32 is opaque, the display may also optionally display entirely computer-generated content (e.g., without displaying images of the physical environment).

Display 32 may include one or more optical systems (e.g., lenses) that allow a viewer to view images on display(s) 16. A single display 32 may produce images for both eyes or a pair of displays 16 may be used to display images. In configurations with multiple displays (e.g., left and right eye displays), the focal length and positions of the lenses may be selected so that any gap present between the displays will not be visible to a user (e.g., so that the images of the left and right displays overlap or merge seamlessly). Display modules that generate different images for the left and right eyes of the user may be referred to as stereoscopic displays. The stereoscopic displays may be capable of presenting two-dimensional content (e.g., a user notification with text) and three-dimensional content (e.g., a simulation of a physical object such as a cube).

Input-output circuitry 20 may include various other input-output devices for gathering data and user input and for supplying a user with output. For example, input-output circuitry 20 may include one or more speakers 34 that are configured to play audio.

Input-output circuitry 20 may include one or more cameras 36. Cameras 36 may include one or more outward-facing cameras (that face the physical environment around the user when the electronic device is mounted on the user's head, as one example). Cameras 36 may capture visible light images, infrared images, or images of any other desired type. The cameras may be stereo cameras if desired. Outward-facing cameras may capture pass-through video for device 10. Cameras 22 may also include inward-facing cameras (e.g., for gaze detection).

Input-output circuitry 20 may include a gaze-tracker 40 (sometimes referred to as a gaze-tracking system or a gaze-tracking camera). The gaze-tracker 40 may be used to obtain gaze input from the user during operation of head-mounted device 10.

Gaze-tracker 40 may include a camera and/or other gaze-tracking system components (e.g., light sources that emit beams of light so that reflections of the beams from a user's eyes may be detected) to monitor the user's eyes. Gaze-tracker(s) 40 may face a user's eyes and may track a user's gaze. A camera in the gaze-tracking system may determine the location of a user's eyes (e.g., the centers of the user's pupils), may determine the direction in which the user's eyes are oriented (the direction of the user's gaze), may determine the user's pupil size (e.g., so that light modulation and/or other optical parameters and/or the amount of gradualness with which one or more of these parameters is spatially adjusted and/or the area in which one or more of these optical parameters is adjusted based on the pupil size), may be used in monitoring the current focus of the lenses in the user's eyes (e.g., whether the user is focusing in the near field or far field, which may be used to assess whether a user is day dreaming or is thinking strategically or tactically), and/or other gaze information. Cameras in the gaze-tracking system may sometimes be referred to as inward-facing cameras, gaze-detection cameras, eye-tracking cameras, gaze-tracking cameras, or eye-monitoring cameras. If desired, other types of image sensors (e.g., infrared and/or visible light-emitting diodes and light detectors, etc.) may also be used in monitoring a user's gaze. The use of a gaze-detection camera in gaze-tracker 40 is merely illustrative.

As shown in FIG. 1, input-output circuitry 20 may include position and motion sensors 38 (e.g., compasses, gyroscopes, accelerometers, and/or other devices for monitoring the location, orientation, and movement of head-mounted device 10, satellite navigation system circuitry such as Global Positioning System circuitry for monitoring user location, etc.). Gyroscopes may measure orientation and angular velocity of the electronic device. As one example, electronic device 10 may include a first gyroscope that is configured to measure rotation about a first axis, a second gyroscope that is configured to measure rotation about a second axis that is orthogonal to the first axis, and a third gyroscope that is configured to measure rotation about a third axis that is orthogonal to the first and second axes. An accelerometer may measure the acceleration felt by the electronic device. As one example, electronic device 10 may include a first accelerometer that is configured to measure acceleration along a first axis, a second accelerometer that is configured to measure acceleration along a second axis that is orthogonal to the first axis, and a third accelerometer that is configured to measure acceleration along a third axis that is orthogonal to the first and second axes. Multiple sensors may optionally be included in a single sensor package referred to as an inertial measurement unit (IMU). Electronic device 10 may include one or more magnetometers that are configured to measure magnetic field. As an example, three magnetometers may be included in an IMU with three accelerometers and three gyroscopes.

Using sensors 38, for example, control circuitry 14 can monitor the current direction in which a user's head is oriented relative to the surrounding environment (e.g., a user's head pose). In one example, position and motion sensors 38 may include one or more outward-facing cameras (e.g., that capture images of a physical environment surrounding the user). The outward-facing cameras may be used for face tracking (e.g., by capturing images of the user's jaw, mouth, etc. while the device is worn on the head of the user), body tracking (e.g., by capturing images of the user's torso, arms, hands, legs, etc. while the device is worn on the head of user), and/or for localization (e.g., using visual odometry, visual inertial odometry, or other simultaneous localization and mapping (SLAM) technique). In addition to being used for position and motion sensing, the outward-facing camera may capture pass-through video for device 10.

Input-output circuitry 20 may include one or more depth sensors 42. Each depth sensor may be a pixelated depth sensor (e.g., that is configured to measure multiple depths across the physical environment) or a point sensor (that is configured to measure a single depth in the physical environment). Camera images (e.g., from one of cameras 36) may also be used for monocular and/or stereo depth estimation. Each depth sensor (whether a pixelated depth sensor or a point sensor) may use phase detection (e.g., phase detection autofocus pixel(s)) or light detection and ranging (LIDAR) to measure depth. Any combination of depth sensors may be used to determine the depth of physical objects in the physical environment.

Input-output circuitry 20 may include a haptic output device 44. The haptic output device 44 may include actuators such as electromagnetic actuators, motors, piezoelectric actuators, electroactive polymer actuators, vibrators, linear actuators (e.g., linear resonant actuators), rotational actuators, actuators that bend bendable members, etc. The haptic output device 44 may be controlled to provide any desired pattern of vibrations.

Input-output circuitry 20 may also include other sensors and input-output components if desired (e.g., ambient light sensors, force sensors, temperature sensors, touch sensors, buttons, capacitive proximity sensors, light-based proximity sensors, other proximity sensors, strain gauges, gas sensors, pressure sensors, moisture sensors, magnetic sensors, microphones, light-emitting diodes, other light sources, wired and/or wireless communications circuitry, etc.).

A user may sometimes provide user input to head-mounted device 10 using position and motion sensors 38. In particular, position and motion sensors 38 may detect changes in head pose (sometimes referred to as head movements) during operation of head-mounted device 10.

Changes in yaw, roll, and/or pitch of the user's head (and, correspondingly, the head-mounted device) may all be interpreted as user input if desired. FIGS. 2A-2C show how yaw, roll, and pitch may be defined for the user's head. FIGS. 2A-2C show a user 24. In each one of FIGS. 2A-2C, the user is facing the Z-direction and the Y-axis is aligned with the height of the user. The X-axis may be considered the side-to-side axis for the user's head, the Z-axis may be considered the front-to-back axis for the user's head, and the Y-axis may be considered the vertical axis for the user's head. The X-axis may be referred to as extending from the user's left ear to the user's right ear, as extending from the left side of the user's head to the right side of the user's head, etc. The Z-axis may be referred to as extending from the back of the user's head to the front of the user's head (e.g., to the user's face). The Y-axis may be referred to as extending from the bottom of the user's head to the top of the user's head.

As shown in FIG. 2A, yaw may be defined as the rotation around the vertical axis (e.g., the Y-axis in FIGS. 2A-2C). As the user's head rotates along direction 26, the yaw of the user's head changes. Yaw may sometimes alternatively be referred to as heading. The user's head may change yaw by rotating to the right or left around the vertical axis. A rotation to the right around the vertical axis (e.g., an increase in yaw) may be referred to as a rightward head movement. A rotation to the left around the vertical axis (e.g., a decrease in yaw) may be referred to as a leftward head movement.

As shown in FIG. 2B, roll may be defined as the rotation around the front-to-back axis (e.g., the Z-axis in FIGS. 2A-2C). As the user's head rotates along direction 28, the roll of the user's head changes. The user's head may change roll by rotating to the right or left around the front-to-back axis. A rotation to the right around the front-to-back axis (e.g., an increase in roll) may be referred to as a rightward head movement. A rotation to the left around the front-to-back axis (e.g., a decrease in roll) may be referred to as a leftward head movement.

As shown in FIG. 2C, pitch may be defined as the rotation around the side-to-side axis (e.g., the X-axis in FIGS. 2A-2C). As the user's head rotates along direction 30, the pitch of the user's head changes. The user's head may change pitch by rotating up or down around the side-to-side axis. A rotation down around the side-to-side axis (e.g., a decrease in pitch following the right arrow in direction 30 in FIG. 2C) may be referred to as a downward head movement. A rotation up around the side-to-side axis (e.g., an increase in pitch following the left arrow in direction 30 in FIG. 2C) may be referred to as an upward head movement.

It should be understood that position and motion sensors 38 may directly determine pose, movement, yaw, pitch, roll, etc. for head-mounted device 10. Position and motion sensors 38 may assume that the head-mounted device is mounted on the user's head. Therefore, herein, references to head pose, head movement, yaw of the user's head, pitch of the user's head, roll of the user's head, etc. may be considered interchangeable with references to device pose, device movement, yaw of the device, pitch of the device, roll of the device, etc.

At any given time, position and motion sensors 38 (and/or control circuitry 14) may determine the yaw, roll, and pitch of the user's head. The yaw, roll, and pitch of the user's head may collectively define the orientation of the user's head pose.

Detected changes in head pose (e.g., orientation) may be used as user input to head-mounted device 10. The changes in head pose may sometimes be referred to as motion gestures, head motion gestures, head rotation gestures, etc. As examples of motion gestures, a first head movement in a first direction may be used to trigger the dismissal of some visual content on display 32 and the presentation of some visual content on display 32. In other words, the head movement in the first direction may cause new visual content to be presented to the user. A second head movement in a second direction that is opposite the first direction may cause head-mounted device 10 to cease presenting that new visual content.

One example of change in head pose being used as user input to head-mounted device 10 is shown in FIGS. 3A-3C. FIG. 3A is a top view of an illustrative extended reality (XR) environment showing a head pose being used as user input. FIGS. 3B and 3C show views perceived by a user viewing display 32 on head-mounted device 10. FIG. 3B shows the view when the user is looking in direction 52-1 in FIG. 3A whereas FIG. 3C shows the view when the user is looking in direction 52-2 in FIG. 3A.

At a first time, user 24 may face direction 52-1. A virtual object 53-1 may be presented at location 54-1 within the extended reality environment such that the virtual object is viewable to the user looking in direction 52-1. As shown in FIG. 3B, the virtual object 53-1 is centered within the user's field-of-view when looking in direction 52-1.

The user may then rotate their head in a clockwise direction as shown by arrow 56 in FIG. 3A. In other words, the user makes a rightward head movement and changes the yaw of their head to look in direction 52-2. The rightward head movement may be interpreted as a motion gesture by head-mounted device 10. The rightward head movement may cause a virtual object to be presented at location 54-2 within the extended reality environment such that the virtual object is viewable to the user looking in direction 52-2. As shown in FIG. 3C, the virtual object 53-2 is centered within the user's field-of-view when looking in direction 52-2.

In general, the virtual object or content presented at locations 54-1 and 54-2 may include world-locked content, head-locked content, and/or body-locked content. In one possible arrangement, the virtual object at location 54-1 is world-locked content and the virtual object at location 54-2 is also world-locked content.

There may be an angle 58 between locations 54-1 and 54-2. In other words, location 54-1 is aligned with direction 52-1 and may be defined as a yaw of 0 degrees. Location 54-2 is aligned with direction 52-2 and may be defined as a yaw of 50 degrees. The angle 58 is therefore equal to 50 degrees.

Figure 4:
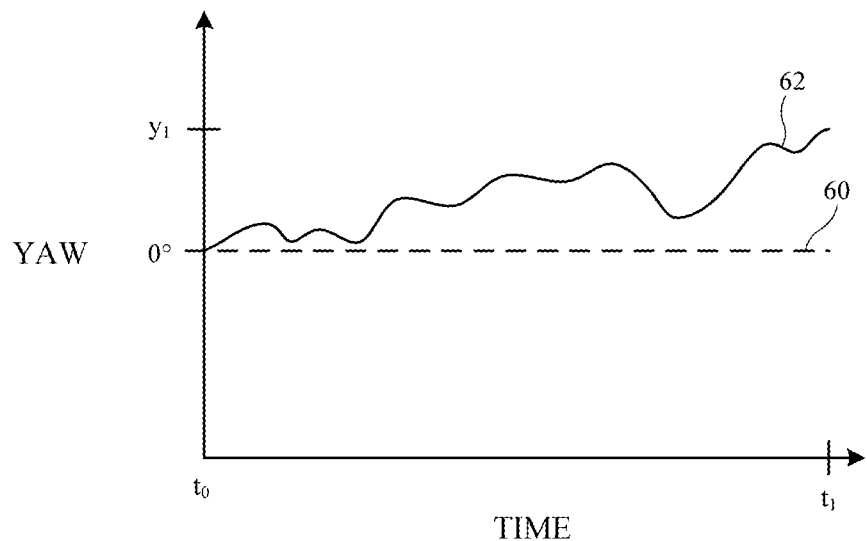
FIG. 4 is a graph of yaw as a function of time for an illustrative motion sensor showing how the measurement drifts over time in accordance with some embodiments.

A motion sensor such as a gyroscope or accelerometer may be used to measure the orientation along a given axis (in this case yaw) over time. There may be error associated with the measurements from the gyroscope or accelerometer. The error may accumulate over time. FIG. 4 is a graph of yaw as a function of time. Profile 60 shows the actual (sometimes referred to as true) yaw of the electronic device. In this example, the yaw is unchanged over time (e.g., the user's head is static). Ideally, the measured yaw would follow profile 60. However, error may cause the measured yaw to deviate from profile 60. Profile 62 shows the measured yaw by the gyroscope in head-mounted device 10. As shown in FIG. 4, profile 62 deviates from profile 60. The difference between profiles 62 and 60 represents the error in the yaw measurement. The magnitude of the error may tend to increase over time.

If care is not taken, the error in yaw over time may accidentally trigger an unintended response from head-mounted device 10. Head movements such as the head movement shown in FIG. 3A are intended to trigger a response from head-mounted device 10 (e.g., the virtual object displayed changes in response to the rightward head movement in FIG. 3A). Error in the yaw measurements may cause false positives in detecting head movements such that head-movement-caused responses are triggered even when no head movement occurs.

Consider the example of FIG. 4 where the user's head remains static (with a yaw of 0 degrees). In the example of FIG. 3A, the user may be presented with virtual object 53-1 at location 54-1 in the extended reality environment. While the yaw remains at 0 degrees, the virtual object 53-1 should remain visible in the center of the user's field-of-view. However, the error in measured yaw may be interpreted as a rightward head movement that triggers the system to instead display virtual object 53-2 (even though the user's head has not actually rotated).

To mitigate these types of unintended responses, a reference orientation for the yaw may be periodically reset. The reference orientation may sometimes be referred to as a baseline or reference point. The reference orientation is the reference from which changes in yaw are measured. Resetting the reference orientation may refer to replacing the previous reference orientation with a currently measured orientation.

In one possible scheme, the reference orientation may always be 0 degrees. All yaw is then measured relative to the reference orientation of 0 degrees. In other words, the reference orientation is fixed in three-dimensional space. However, with this type of arrangement the error (sometimes referred to as drift) in yaw measurements increases over time.

To mitigate the impact of error in the yaw measurements, the reference orientation may be reset. For example, consider the profiles of FIG. 4. At $t_1$, the measured yaw (as indicated in profile 62) has a non-zero magnitude $Y_1$ (even though the actual yaw is 0 degrees). At $t_1$, the reference orientation may be reset from 0 degrees to $Y_1$. $Y_1$ may be used as the baseline for future changes in yaw. Said another way, $Y_1$ may be used as a new 0 degree reference point for future changes in yaw.

One possible trigger for resetting the reference orientation for a motion sensor (sometimes referred to as rebaselining the motion sensor) is detecting a motion that satisfies at least one criterion. The criterion may be selected to distinguish between deliberate head movements from the user (e.g., an intentional rightward head movement by the user to trigger a response) and drift associated with the motion sensor. In other words, the criterion may be used to detect a motion gesture that is used by the user to provide deliberate input.

One possible criterion for distinguishing between measured changes in yaw caused by intentional head movements and measured changes in yaw caused by drift is the total measured change in yaw. A threshold may be selected that is unlikely to be met by change in yaw caused by drift. In this example, once the yaw changes by more than the threshold, the change in yaw is assumed to be caused by a deliberate head movement and not by drift. The threshold may be greater than or equal to 10 degrees, greater than or equal to 20 degrees, greater than or equal to 30 degrees, greater than or equal to 40 degrees, greater than or equal to 50 degrees, greater than or equal to 60 degrees, greater than or equal to 70 degrees, greater than or equal to 80 degrees, greater than or equal to 90 degrees, less than 90 degrees, less than 70 degrees, less than 50 degrees, between 20 degrees and 60 degrees, etc.

Consider an example where the threshold is 30 degrees. In this example, a change in yaw of 20 degrees (or some other magnitude that is less than 30 degrees) is not interpreted as a rightward head movement gesture and a change in yaw of 40 degrees (or some other magnitude that is greater than 40 degrees) is interpreted as a rightward head movement gesture.

Another possible criterion for distinguishing between measured changes in yaw caused by intentional head movements and measured changes in yaw caused by drift is the rate of measured change in yaw. A threshold may be selected that is unlikely to be met by change in yaw caused by drift. In this example, once the yaw changes at a rate that is greater than the threshold, the change in yaw is assumed to be caused by a deliberate head movement and not by drift. The threshold may be greater than or equal to 2 degrees per second, greater than or equal to 4 degrees per second, greater than or equal to 5 degrees per second, greater than or equal to 8 degrees per second, greater than or equal to 10 degrees per second, less than 10 degrees per second, less than 7 degrees per second, less than 5 degrees per second, etc.

Consider an example where the threshold is 5 degrees per second. In this example, a change in yaw at a rate of 3 degrees per second (or some other magnitude that is less than 5 degrees per second) is not interpreted as a rightward head movement gesture and a change in yaw of 8 degrees per second (or some other magnitude that is greater than 5 degrees per second) is interpreted as a rightward head movement gesture.

It is noted that the rate of change of yaw may need to exceed the threshold for a given duration of time to meet the criterion. For example, the duration of time may be 1 full second. If the rate of change exceeds the threshold for less than 1 second, the change in yaw will be assumed to be caused by drift. If the rate of change exceeds the threshold for greater than 1 second, the change in yaw will be assumed to be caused by a head movement. The duration of time may be greater than or equal to 0.5 seconds, greater than or equal to 1 second, greater than or equal to 2 seconds, greater than or equal to 4 seconds, greater than or equal to 6 seconds, less than 6 seconds, less than 4 seconds, between 1 second and 5 seconds, etc.

One or more of the aforementioned criteria may be used to, for example, identify a qualifying motion (sometimes referred to as an intentional motion, deliberate motion, or motion gesture). One or more additional criteria may optionally be used to identify when the qualifying motion stops/concludes.

For example, one possible criterion for identifying the end of a motion gesture is the rate of change in the yaw. In this example, once the yaw changes at a rate that is less than the threshold, the motion is assumed to be concluded. The threshold may be greater than or equal to 2 degrees per second, greater than or equal to 4 degrees per second, greater than or equal to 5 degrees per second, greater than or equal to 8 degrees per second, greater than or equal to 10 degrees per second, less than 10 degrees per second, less than 7 degrees per second, less than 5 degrees per second, etc.

Another possible trigger for resetting the reference orientation for a motion sensor (sometimes referred to as rebaselining the motion sensor) is a duration of time elapsing without detecting a motion that satisfies at least one criterion. In other words, even if no qualifying motion is detected, the reference orientation may be periodically reset to mitigate the accumulation of error over time. The duration of time used as the threshold for resetting the reference orientation in the absence of a qualifying motion may be greater than 5 seconds, greater than 10 seconds, greater than 20 seconds, greater than 30 seconds, less than 30 seconds, less than 20 seconds, less than 10 seconds, etc.

FIGS. 5A-5D show various examples for how the reference orientation of a motion sensor may be reset. FIGS. 5A-5D explicitly show yaw as a function of time, but it should be understood that these principles may be applied to roll and pitch in the same manner.

Figure 5A:
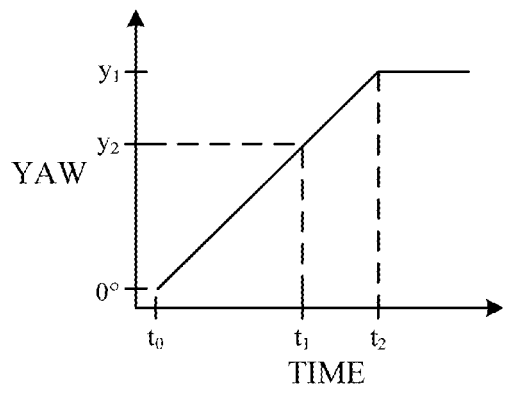
FIG. 5A is a graph of yaw as a function of time for an illustrative motion sensor showing how an absolute change in yaw may be used as a trigger for a reset in reference orientation for the motion sensor in accordance with some embodiments.

FIG. 5A shows a measured yaw over time. At $t_0$, the yaw is 0 degrees. The yaw increases from 0 to $Y_1$ between $t_0$ and $t_2$. In this case, an absolute magnitude of change in yaw may be used as the criterion to detect a qualifying head motion. The threshold for change in yaw that qualifies may be $Y_2$. As shown in FIG. 5A, the yaw exceeds the threshold $Y_2$ at $t_1$. Therefore, the head-mounted device may detect the qualifying motion associated with the rightward head movement at $t_1$. In response to detecting the qualifying motion, the reference orientation for the motion sensor that measures the yaw may be reset.

The time at which the reference orientation is reset may be as soon as the qualifying motion is detected. Applying this scheme to the example of FIG. 5A, the qualifying motion is detected at $t_1$ so the yaw at $t_1$ ($Y_2$) may be used as the new reference orientation.

Alternatively, the time at which the reference orientation is reset may be as soon as the qualifying motion is determined to have concluded. Applying this scheme to the example of FIG. 5A, the qualifying motion concludes at $t_2$ so the yaw at $t_2$ ($Y_1$) may be used as the new reference orientation.

Figure 5B:
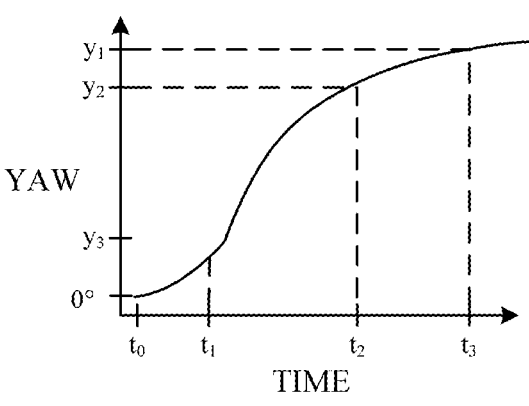
FIG. 5B is a graph of yaw as a function of time for an illustrative motion sensor showing how a rate of change in yaw may be used as a trigger for a reset in reference orientation for the motion sensor in accordance with some embodiments.

FIG. 5B shows another example of measured yaw over time. At $t_0$, the yaw is 0 degrees. The yaw increases in a non-linear manner from 0 to $Y_1$ between $t_0$ and $t_3$. In this case, a rate of change in yaw may be used as the criterion to detect a qualifying head motion. The threshold rate may be exceeded at $t_1$ (when the measured yaw is equal to $Y_3$). Therefore, the head-mounted device may detect the qualifying motion associated with the rightward head movement at $t_1$. In response to detecting the qualifying motion, the reference orientation for the motion sensor that measures the yaw may be reset.

The time at which the reference orientation is reset may be as soon as the qualifying motion is determined to have concluded. For example, there may be a threshold rate of change for the yaw that defines the conclusion of the motion. In FIG. 5B, the measured rate of change drops below the threshold at $t_2$, so the yaw at $t_2$ ($Y_2$) may be used as the new reference orientation (even though there is still a measured gradual increase of yaw between $t_2$ and $t_3$).

Figure 5C:
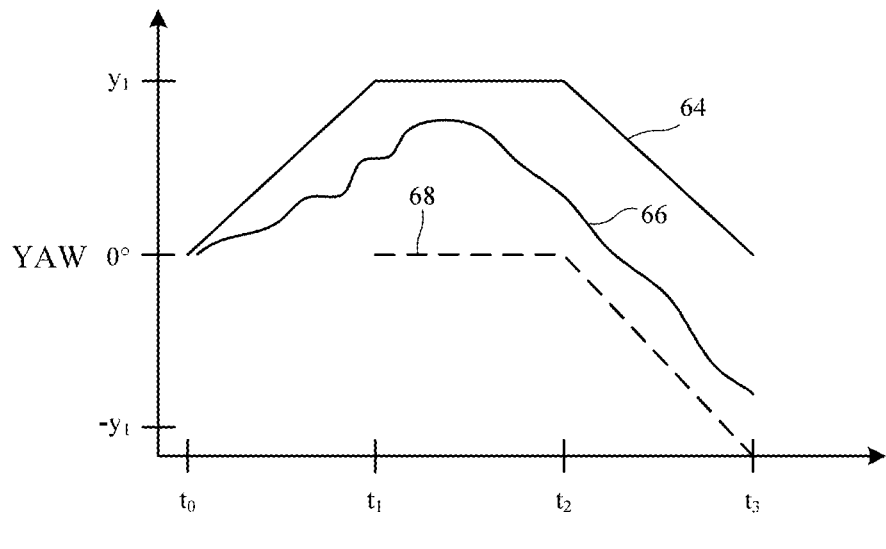
FIG. 5C is a graph of yaw as a function of time for an illustrative motion sensor showing how a reference orientation for the motion sensor may be reset after a head movement in accordance with some embodiments.

FIG. 5C shows an example with a profile 64 that reflects the actual yaw of the user. Profile 66 reflects the measured yaw when the reference orientation is not reset after a head movement. Profile 68 reflects the measured yaw when the reference orientation is reset after a head movement. It is noted that profile 68 may be the same as profile 66 until $t_1$.

As shown by profile 64, the actual yaw may gradually increase between $t_0$ and $t_1$ (e.g., the user makes a rightward head movement), remain steady between $t_1$ and $t_2$, and gradually decrease between $t_2$ and $t_3$ (e.g., the user makes a leftward head movement back to their starting position from $t_0$).

When the reference orientation of the motion sensor is not reset after the rightward head movement, the error accumulates over time. As shown by profile 66, the measured yaw deviates from the actual yaw by an increasing amount over time. The deviation between the measured yaw and the actual yaw may cause an incorrect response from the electronic device. For example, in FIG. 5C the user does not start the leftward head movement until $t_2$. However, the drift in the sensor may cause a leftward head movement to be detected before $t_2$.

Profile 68 shows an example where the reference orientation is reset to 0 degrees at $t_1$. The measured yaw in this scenario is less likely to cause false positives associated with drift than when the reference orientation is not reset. As shown by profile 68, the measured yaw may gradually decrease from 0 degrees to $-Y_1$ degrees between $t_2$ and $t_3$ (with some deviation caused by the drift of the sensor). Therefore, the total change in yaw measured between $t_2$ and $t_3$ may be similar in profile 68 (e.g., $-Y_1-0=-Y_1$) to as in profile 64 (e.g., $0-Y_1=-Y_1$).

Resetting the sensor in response to the detected head movement therefore improves performance of the head-mounted device. It is noted that resetting the sensor between the rightward head movement and leftward head movement of FIG. 5C may cause minor changes to the position of virtual content 53-1 relative to the user's physical environment. However, because the virtual content 53-1 is newly presented after the leftward head movement, a minor change in position (relative to before the rightward and leftward head movements occurred) may not be noticeable or negatively impact the user experience.

Figure 5D:
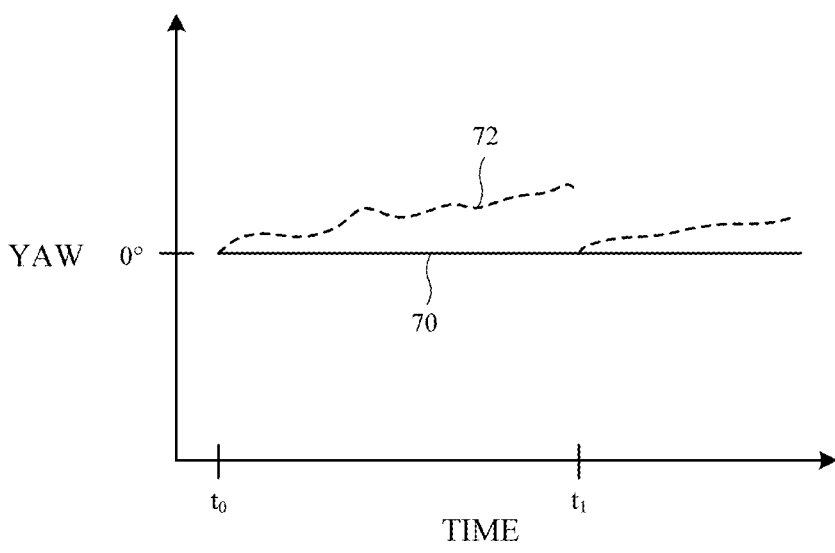
FIG. 5D is a graph of yaw as a function of time for an illustrative motion sensor showing how a reference orientation for the motion sensor may be reset after a duration of time elapses without a qualifying head movement in accordance with some embodiments.

FIG. 5D shows how the motion sensor may be reset after a duration of time elapses even when there is no qualifying motion. Profile 70 reflects the actual yaw of the user (in this case, the head does not move and stays at 0 degrees). Profile 72 reflects the measured yaw when the reference orientation is reset after a threshold duration of time.

In FIG. 5D, the threshold duration of time for the time out functionality is equal to $t_1$. Between $t_0$ and $t_1$, the measured yaw (of profile 72) deviates from the actual yaw (of profile 70) due to drift. At $t_1$, the reference orientation is reset after no qualifying motions are detected between $t_0$ and $t_1$. Resetting the reference orientation causes the measured yaw to align with the actual yaw of 0 degrees. The measured yaw may then again start to drift from the actual yaw and can be periodically reset each time the duration of time elapses without a qualifying movement.

There are multiple options for how to reset the reference orientation of a motion sensor. One possible arrangement, shown in FIG. 6, is to reset the reference orientation within the motion sensor itself. FIG. 6 shows a schematic diagram of a gyroscope 38 and control circuitry 14. As shown, gyroscope 38 may output motion data to control circuitry 14. Control circuitry 14 may analyze the motion data to identify qualifying motions that meet one or more criteria, identify when qualifying motions conclude, and/or determine when to reset a reference orientation of the motion sensor. Control circuitry 14 may, based on a determination to reset the reference orientation, send instructions (sometimes referred to as reset instructions or rebaseline instructions) to gyroscope 38 to cause the gyroscope to reset the reference orientation. The subsequent motion data output from the gyroscope is then relative to the new reference orientation.

As an example, gyroscope 38 may initially use 0 degrees as the reference orientation. Motion data output from the gyroscope is determined relative to the 0 degree reference orientation. After a rightward head movement (with +40 degrees of yaw), the reference orientation may be reset. Subsequent motion is then determined relative to the new, second reference orientation (which may be now referred to as 0 degrees even though the difference between the first and second reference orientations is 40 degrees). After a leftward head movement (with −30 degrees of yaw), the reference orientation may be reset. Subsequent motion is then determined relative to the new, third reference orientation (which may be now referred to as 0 degrees even though the difference between the second and third reference orientations is 30 degrees).

FIG. 6 also shows how filtering circuitry such as filtering circuitry 76 may be included in head-mounted device 10. The filtering circuitry may be included within control circuitry 14. Filtering circuitry 76 may apply a filter to the motion data received from gyroscope 38. The filter may be, as examples, a low-pass filter, band-pass filter, high-pass filter, etc. In one arrangement, filtering circuitry 76 may apply a high-pass filter to the motion data from gyroscope 38. The high-pass filter may filter out low frequency motion data caused by drift and/or unintentional head movements, improving the detection of intentional head movements. The filtering circuitry may dynamically filter the motion data if desired. In other words, the filtering circuitry may filter the motion data in different manners at different times. The control circuitry 14 may use the filtered data to detect head movements (sometimes referred to as head gestures). In some cases, the control circuitry may use the raw motion data for other applications. For example, the control circuitry may filter the motion data in a first manner for detecting motion gestures and may filter the motion data in a second manner for a different function within head-mounted device 10. The raw motion data may therefore be preserved by filtering circuitry 76.

The example in FIG. 6 of control circuitry 14 including filtering circuitry 76 is merely illustrative. If desired, the filtering circuitry may be included in gyroscope 38 itself (such that the filtered motion data is output from the gyroscope). The gyroscope may optionally output two sets of data: unfiltered data (which may optimize accuracy for angular orientation at a given point in time) and filtered data (which may optimize accuracy in detecting intentional head gestures).

An alternative approach is shown in the schematic diagram of FIG. 7. As shown, gyroscope 38 may output motion data to control circuitry 14. Control circuitry 14 may analyze the motion data to identify qualifying motions that meet one or more criteria, identify when qualifying motions conclude, and/or determine when to reset a reference orientation of the motion sensor. Control circuitry 14 may use the motion data to assess motion relative to a stored reference orientation 74 (e.g., stored in memory). With this scheme, gyroscope 38 may always output motion data that is relative to a first reference orientation (e.g., 0 degrees). Control circuitry 14 may store a reference orientation that is (possibly) different than the first reference orientation.

As an example, control circuitry 14 may initially store 0 degrees as the stored reference orientation 74. Motion is determined relative to the 0 degree reference orientation. After a rightward head movement (with +40 degrees of yaw), the reference orientation may be reset by replacing the stored reference orientation with a new value of 40 degrees. Subsequent motion data is then used to assess motion relative to the stored 40 degree reference orientation. After a leftward head movement (with −30 degrees of yaw), the reference orientation may be reset by replacing the stored reference orientation with a new value of 10 degrees. Subsequent motion data is then used to assess motion relative to the stored 10 degree reference orientation.

Filtering circuitry of the type shown and discussed in FIG. 6 may be included in gyroscope 38 or control circuitry 14 of FIG. 7 if desired.

Figure 8:
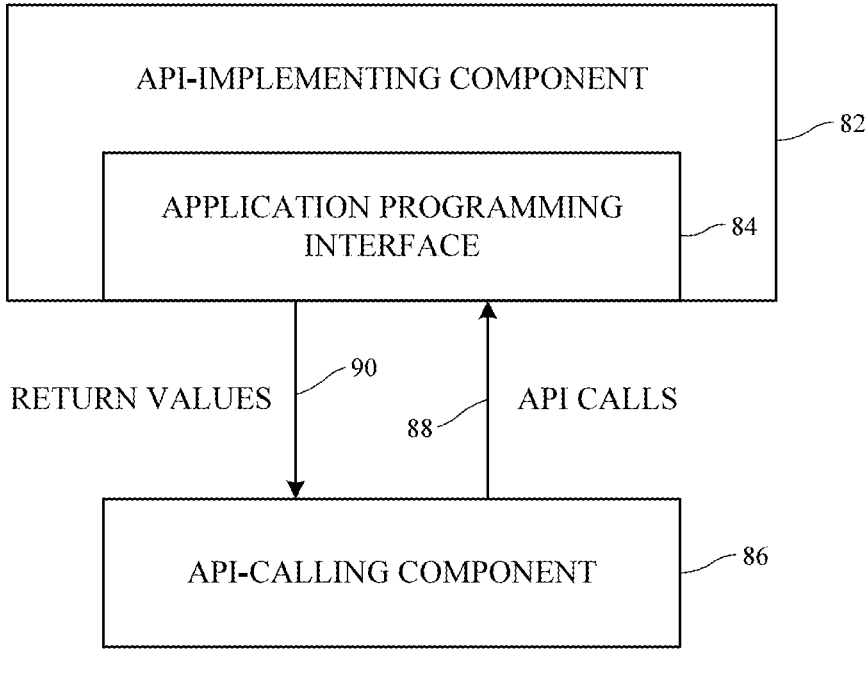
FIG. 8 is a schematic diagram of an illustrative application programming interface (API) architecture that may be used in a head-mounted device in accordance with some embodiments.

FIG. 8 is a schematic diagram of an illustrative application programming interface (API) architecture that may be used in head-mounted device 10. The API architecture includes an API-implementing component 82 (e.g., an operating system, a library, a device driver, an API, an application program, software or other module) that implements API 84. Each one of API-implementing component 82, API 84, and API-calling component 86 may be considered a part of control circuitry 14.

API 84 may specify at least one calling convention that specifies how a function in the API-implementing component receives parameters from the API-calling component and how the function returns a result to the API-calling component. The API-calling component 86 (e.g., an operating system, a library, a device driver, an API, an application program, software or other module), makes API calls 88 through the API 84 to access and use the features of the API-implementing component 82 that are specified by the API 84. The API-implementing component 82 may return a value 90 through the API 84 to the API-calling component 86 in response to an API call.

API-calling component 86 may make API calls 88 that request motion data (e.g., information regarding the yaw, roll, and/or pitch of the head-mounted device). In one possible arrangement, these types of API calls requesting motion data may cause the API 84 to return only raw motion data from one or more motion sensors in the electronic device. However, this may require the API-calling component to then analyze the raw motion data to identify head motion gestures.

In another possible arrangement, the API calls may be used to request a notification when a certain type of motion gesture (e.g., a rightward head movement or a leftward head movement) occurs. In this case, the return value 90 output by the API may simply be a notification that a certain type of head movement has occurred. The return value may identify a possible head movement, the start of a head movement, an in-progress head movement, the end of a head movement, or simply that a head movement has occurred (without further granularity regarding the start/end of the movement). This may simplify operation for the API-calling component in cases where head motion gestures are used by the API-calling component without needing precise angular orientation information.

With the arrangement of FIG. 8, the API-calling component 86 may still optionally request more detailed motion data such as the raw motion data, rate of change in the angular orientation, etc.

FIG. 9 is a flowchart showing an illustrative method for operating an electronic device with a motion sensor. At block 102, a reference orientation associated with the motion sensor is set to a first baseline. Next, at block 104, the electronic device (e.g., control circuitry 14) may obtain motion data from the motion sensor that is representative of a motion of the electronic device. The motion may be a motion gesture that includes rotational motion, as one example. The motion data may optionally be filtered (e.g., by filtering circuitry 76) in any desired manner (e.g., using a high-pass filter).

During the operations of block 106, the electronic device may, in accordance with a determination that the motion defined relative to the reference orientation satisfies a criterion, reset the reference orientation to a second baseline. The criterion may include a total change in measured angular orientation (e.g., yaw) exceeding a threshold. The criterion may include a rate of change in the measured angular orientation exceeding a threshold (optionally for a given duration of time). The criterion may be used to detect a motion gesture such as a rotational motion gesture. The criterion may be used to determine the motion gesture has concluded.

Resetting the reference orientation to the second baseline may include sending a reset instruction to the one or more motion sensors (e.g., from control circuitry 14 as shown in FIG. 6). Alternatively, the control circuitry may store the reference orientation and may replace the stored reference orientation when resetting the reference orientation (e.g., as shown in FIG. 7).

Resetting the reference orientation at block 106 may include resetting the orientation of one motion sensor (e.g., the motion sensor that detects the motion) or multiple motion sensors (e.g., the motion sensor that detects the motion and other motion sensors). Consider an example where electronic device 10 includes a first gyroscope configured to measure rotational motion about a first axis (e.g., yaw), a second gyroscope configured to measure rotational motion about a second axis that is orthogonal to the first axis (e.g., roll), and a third gyroscope configured to measure rotational motion about a third axis that is orthogonal to the first and second axes (e.g., pitch). The first gyroscope may detect the motion that satisfies the criterion. In one arrangement, the reference orientation of only the first gyroscope is reset in response to the first gyroscope detecting the qualifying motion. In another possible arrangement, the reference orientations of the first, second, and third gyroscopes are all reset in response to the first gyroscope detecting the qualifying motion. In other words, detecting a qualifying motion using a given motion sensor may cause the reference orientation to be reset for the given motion sensor and any other additional desired motion sensors.

Next, during the operations of block 108, the electronic device may present content using one or more output devices in accordance with the determination that the motion defined relative to the reference orientation satisfies the criterion. As previously presented, the criterion may be used to detect a motion gesture. Accordingly, content may be presented in accordance with detecting the motion gesture.

The content presented at block 108 may include visual content presented using display 32, audio content presented using speaker 34, haptic output presented using haptic output device 44, and/or any other desired type of content. The content may include augmented reality content, a notification, an application, etc.

The operations of block 108 may include selecting a position for the content based on the motion data (as shown in block 110) and presenting the content at the position using the display (as shown in block 112). In other words, the presented content may be positioned at a specific angular orientation relative to the head-mounted device (based on the motion data regarding angular orientation that is gathered by the one or more motion sensors).

It is further noted that the content presented at block 108 may serve as feedback to the user that a motion gesture has been detected. For example, if a rightward head movement is detected as an intentional motion gesture, a rightward-facing arrow may be presented on display 32 to identify the head motion gesture detected by device 10. As another example, a chime may be played using speaker 34 to indicate the detection of a head motion gesture.

During the operations of block 114, while the reference orientation is set to the second baseline (from block 106), the electronic device may obtain motion data representative of an additional motion of the electronic device. During the operations of block 116, in accordance with a determination that the additional motion defined relative to the reference orientation satisfies the criterion, the electronic device may reset the reference orientation to a third baseline. In other words, the reference orientation may be reset to a new baseline each time a qualifying motion (that satisfies the criterion) is detected.

During the operations of block 118, the electronic device may cease to present the content using the one or more output devices. The additional motion from block 116 may cause the electronic device to cease to present the content. As one example, a rightward head movement at block 104 may cause the electronic device to present visual content. Then, a leftward head movement at block 116 may cause the electronic device to cease presenting the visual content at block 118.

During the operations of block 120, the electronic device may reset the reference orientation to a fourth baseline in response to a duration of time passing without a motion satisfying the criterion. The duration of time may be equal to 10 seconds, greater than 5 seconds, between 5 seconds and 30 seconds, etc. Resetting the reference orientation periodically in this manner may prevent the accumulation of drift in the motion sensor over time.

As an example, a gyroscope in a head-mounted device may be used to measure yaw. While the user has a yaw of 0 degrees, the reference orientation may be set to a first baseline of 0 degrees at block 102. Motion data from the gyroscope representative of a rightward head motion may be obtained at block 104. At block 106, it may be determined that the motion data identifies a qualifying motion (e.g., due to a total change in yaw exceeding a threshold and/or a rate of change of yaw exceeding a threshold). Accordingly, the reference orientation may be reset to a second baseline. The reference orientation may optionally be reset to the second baseline after the rightward head motion is complete. As one example, while the measured yaw is equal to 50 degrees and after the rightward head motion is complete, the 50 degree yaw may be used as the new baseline.

At block 110, the electronic device may select a position for visual content based on the motion data. The content may then be presented at the selected position using display 32 at block 112. The visual content may be a notification, an application, or other desired content such as augmented-reality content.

Next, while the reference orientation is set to the second baseline, motion data from the gyroscope representative of a leftward head motion may be obtained at block 114. At block 116, it may be determined that the motion data identifies an additional qualifying motion (e.g., due to a total change in yaw exceeding a threshold and/or a rate of change of yaw exceeding a threshold). Accordingly, the reference orientation may be reset to a third baseline. The reference orientation may optionally be reset to the second baseline after the leftward head motion is complete. As one example, while the measured yaw is equal to −45 degrees and after the leftward head motion is complete, the −45 degree yaw may be used as the new baseline. At block 118, the leftward head motion may cause the electronic device to cease presenting the content from block 112.

Next, at block 120, in accordance with a 10 second timeout period passing without detecting a motion satisfying the criterion, the reference orientation may be reset to a fourth baseline. Consider an example where the measured yaw drifts from the third baseline to 3 degrees over the 10 second timeout period. At block 120, the 3 degree yaw at the end of the timeout period may be used as the new baseline.

FIG. 10 is a flowchart showing an illustrative method for operating an electronic device with a motion sensor and an application programming interface. During the operations of block 122, an application programming interface (API) 84 may receive an API call that is associated with a motion gesture. The API call may be received from API-calling component 86 (which may be an application program or other desired component). The API call may be associated with a motion gesture. For example, the API call may be a request for a notification when a particular motion gesture (e.g., a rightward head movement, a leftward head movement, an upward head movement, a downward head movement, etc.) occurs. The API call may specify if the motion gesture requires change(s) in yaw, pitch, and/or roll.

During the operations of block 124, in accordance with a determination that the motion satisfies a criterion (e.g., the motion gesture identified in the API call is detected), the API may output a return value identifying the motion gesture to the API-calling component. Any of the criteria discussed above (e.g., total change in angular orientation, rate of change of angular orientation, etc.) may be used. The return value may identify a possible motion gesture, the start of the motion gesture, an in-progress motion gesture, and/or the end of the motion gesture.

The foregoing is merely illustrative and various modifications can be made to the described embodiments. The foregoing embodiments may be implemented individually or in any combination.

What is claimed is:

1. An electronic device comprising:
   one or more motion sensors;
   one or more processors; and
   memory storing instructions configured to be executed by the one or more processors, the instructions for:
   setting a reference orientation to a first baseline;
   obtaining, from the one or more motion sensors, motion data representative of a motion of the electronic device;
   in accordance with detecting a rotational motion gesture based on the motion defined relative to the reference orientation, resetting the reference orientation to a second baseline;
   while the reference orientation is set to the second baseline, obtaining, from the one or more motion sensors, motion data representative of an additional motion of the electronic device; and in accordance with detecting an additional rotational motion gesture based on the additional motion defined relative to the reference orientation, resetting the reference orientation to a third baseline.

2. The electronic device defined in claim 1, wherein detecting the rotational motion gesture comprises detecting a total magnitude of rotational motion exceeding a threshold magnitude.

3. The electronic device defined in claim 1, wherein detecting the rotational motion gesture comprises detecting a magnitude of a rate of rotation exceeding a threshold magnitude.

4. The electronic device defined in claim 1, wherein the instructions further comprise instructions for:
   in accordance with a duration of time passing without detecting a rotational motion gesture, resetting the reference orientation to a fourth baseline, wherein the duration of time is greater than 5 seconds.

5. The electronic device defined in claim 1, wherein the one or more motion sensors comprises an inertial measurement unit, a gyroscope, an accelerometer, or a magnetometer.

6. The electronic device defined in claim 1, further comprising:
   one or more output devices, wherein the instructions further comprise instructions for:
   in accordance with detecting the rotational motion gesture based on the motion defined relative to the reference orientation, presenting content using the one or more output devices, wherein the one or more output devices comprises a speaker, a haptic output device, or a display.

7. The electronic device defined in claim 1, wherein the instructions further comprise instructions for:
   filtering the motion data representative of the motion of the electronic device, wherein filtering the motion data comprises applying a high-pass filter to the motion data.

8. A method of operating an electronic device that comprises one or more motion sensors, the method comprising:
   setting a reference orientation to a first baseline;
   obtaining, from the one or more motion sensors, motion data representative of a motion of the electronic device;
   in accordance with detecting a rotational motion gesture based on the motion defined relative to the reference orientation, resetting the reference orientation to a second baseline;
   while the reference orientation is set to the second baseline, obtaining, from the one or more motion sensors, motion data representative of an additional motion of the electronic device; and
   in accordance with detecting an additional rotational motion gesture based on the additional motion defined relative to the reference orientation, resetting the reference orientation to a third baseline.

9. The method defined in claim 8, wherein detecting the rotational motion gesture comprises detecting a total magnitude of rotational motion exceeding a threshold magnitude.

10. The method defined in claim 8, wherein detecting the rotational motion gesture comprises detecting a magnitude of a rate of rotation exceeding a threshold magnitude.

11. The method defined in claim 8, further comprising:
   in accordance with a duration of time passing without detecting a rotational motion gesture, resetting the reference orientation to a fourth baseline, wherein the duration of time is greater than 5 seconds.

12. The method defined in claim 8, wherein the one or more motion sensors comprises an inertial measurement unit, a gyroscope, an accelerometer, or a magnetometer.

13. The method defined in claim 8, wherein the electronic device comprises one or more output devices and wherein the method further comprises:
   in accordance with detecting the rotational motion gesture based on the motion defined relative to the reference orientation, presenting content using the one or more output devices, wherein the one or more output devices comprises a speaker, a haptic output device, or a display.

14. The method defined in claim 8, further comprising:

filtering the motion data representative of the motion of the electronic device, wherein filtering the motion data comprises applying a high-pass filter to the motion data.

15. A non-transitory computer-readable storage medium storing one or more programs configured to be executed by one or more processors of an electronic device that comprises one or more motion sensors, wherein the one or more programs include instructions for:

setting a reference orientation to a first baseline;

obtaining, from the one or more motion sensors, motion data representative of a motion of the electronic device;

in accordance with detecting a rotational motion gesture based on the motion defined relative to the reference orientation, resetting the reference orientation to a second baseline;

while the reference orientation is set to the second baseline, obtaining, from the one or more motion sensors, motion data representative of an additional motion of the electronic device; and in accordance with detecting an additional rotational motion gesture based on the additional motion defined relative to the reference orientation, resetting the reference orientation to a third baseline.

16. The non-transitory computer-readable storage medium defined in claim 15, wherein detecting the rotational motion gesture comprises detecting a total magnitude of rotational motion exceeding a threshold magnitude.

17. The non-transitory computer-readable storage medium defined in claim 15, wherein detecting the rotational motion gesture comprises detecting a magnitude of a rate of rotation exceeding a threshold magnitude.

18. The non-transitory computer-readable storage medium defined in claim 15, wherein the instructions further comprise instructions for:

in accordance with a duration of time passing without detecting a rotational motion gesture, resetting the reference orientation to a fourth baseline, wherein the duration of time is greater than 5 seconds.

19. The non-transitory computer-readable storage medium defined in claim 15, wherein the one or more motion sensors comprises an inertial measurement unit, a gyroscope, an accelerometer, or a magnetometer.

20. The non-transitory computer-readable storage medium defined in claim 15, wherein the electronic device comprises one or more output devices and wherein the instructions further comprise instructions for:

in accordance with detecting the rotational motion gesture based on the motion defined relative to the reference orientation, presenting content using the one or more output devices, wherein the one or more output devices comprises a speaker, a haptic output device, or a display.

21. The non-transitory computer-readable storage medium defined in claim 15, wherein the instructions further comprise instructions for:

filtering the motion data representative of the motion of the electronic device, wherein filtering the motion data comprises applying a high-pass filter to the motion data.

* * * * *